Patented Apr. 22, 1941

2,238,936

UNITED STATES PATENT OFFICE 2,238,936

COMPOUNDS OF THE ETIO-CHOLANE SERIES

Friedrich Hildebrandt, Hohen Neuendorf, near Berlin, Germany, assignor to Schering Corporation, Bloomfield, N. J., a corporation of New Jersey No Drawing. Application March 25, 1937, Serial No. 132,973. In Germany March 26, 1936

7 Claims. (Cl. 260—397)

This invention relates to compounds of the etio-cholane series and a method of producing the same, and is an improvement in or modification of the process described in my copending application Serial No. 748,664.

The copending application No. 748,664 describes and claims a process for the manufacture of therapeutically valuable compounds which consists in causing germinal gland hormones containing a keto group of the type of the follicle and testicle hormones or substances containing a keto group of similar constitution and similar physiological effect to interact with metal organic agents. The compounds thus obtained are distinguished by an increase of their physiological activity.

The ketones employed according to the said process belong, in so far as they are numbered among the testicle hormones and the substances of similar constitution and similar effect, and in so far as they are of saturated nature, to the etio-allo-cholane series, that is to say, the six membered rings usually indicated by A and B are in these compounds in trans-position to one another; for greater detail see, for example, Ruzicka, Helv. Chim. Acta 17 (1934), page 1396.

In accordance with the present invention in a similar manner new compounds are obtained when metal organic agents are caused to react upon substances containing a keto group of the etio-cholane series, that is to say, on such substances in which the six membered rings usually indicated by A and B are in cis-position to one another. These substances possess otherwise the same constitution as the saturated testicle hormone compounds which come into consideration as starting materials for the process of the copending application No. 748,664, but in contra-distinction thereto exhibit no noteworthy physiological effect of themselves. The advance which is achieved by the process of the present invention thus does not consist so much in an increase of specific physiological properties as in that the compounds obtainable according to the invention constitute valuable intermediate products for the production of physiologically active substances.

Suitable starting materials for the present process are, for example, the 3-hydroxy and 3-epi-hydroxy-etio-cholanones-(17), to which the following configuration is ascribed:

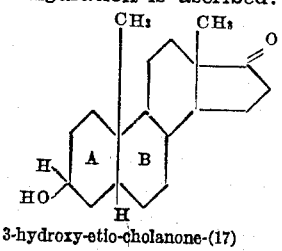

3-hydroxy-etio-cholanone-(17)

3-epi-hydroxy-etio-cholanone-(17)

A hydroxyl group present in the starting material containing a keto group can, prior to reaction with the metal organic agent, be converted by esterification, etherification or the like into a group which by hydrolysis is reconverted into the hydroxyl group. It is possible in this manner to obtain compounds in which one hydroxyl group is already replaced by a group which by hydrolysis can further be converted into the hydroxyl group; by further suitable treatment it is also possible, if desired, to convert the still free hydroxyl group into a group which by hydrolysis can be reconverted into the hydroxyl group. By corresponding selection of the reaction components it is thus possible to produce compounds in which the two hydroxyl groups are replaced by the same or different groups which, on hydrolysis, can be reconverted into hydroxyl groups.

As metal organic agents there come into consideration for the present process all such as are capable of converting a keto group into an alcohol group, in particular the organo-magnesium agents, the so-called Grignard agents. Usually by this means the organic radical of the metal organic compound is introduced into the ketone serving as starting material with formation of the corresponding tertiary alcohol. It is, however, also possible to convert the keto group of the starting material into a secondary alcohol group when such metal organic compounds are employed as incline to the formation of unsaturated hydrocarbons, as, for example, isopropyl magnesium iodide and the like; for more detailed explanation of these types of reaction which are known per se reference is made to Houben-Weyl, Methoden der organischen Chemie, vol. 2, 3rd edition (1930), page 248, and vol. 3, 3rd edition (1925), page 81 seq. These organo-metallic compounds capable of converting keto groups into alcohol groups, whose most representative members are the organo-magnesium halides, will be defined in the appended claims as "organo-metallic compounds of the Grignard type."

The following examples serve to illustrate the invention without, however, limiting the same to them:

Example 1

400 mg. of 3-hydroxy-etio-cholanone-(17) of melting point 151 to 152° C. are dissolved in 100 ccs. of dry ether and introduced into a solution produced from 0.5 gram of dry magnesium turnings, 1.3 ccs. of methyl iodide, 20 ccs. of dry ether and a trace of iodine. The combined solutions are heated for 1 to 2 hours to boiling on the water bath, thereupon they are allowed to cool and the reaction mixture poured on ice and decomposed with dilute hydrochloric acid.

Thereupon the reaction mixture is extracted with ether, the ethereal solution washed free from acid and evaporated to dryness. There is thus obtained the 17-methyl-etio-cholandiol-(3,17).

Example 2

In the same manner as described in Example 1, 3-epi-hydroxy-etio-cholanone-(17) of M. P. 150 to 151° C. is brought into reaction in ether with an ethereal solution of ethyl magnesium iodide. There is thus obtained the corresponding 17-ethyl-etio-cholandiol-(3,17).

Example 3

1 gram of the acetate of 3-hydroxy-etio-cholanone-(17) is treated in ethereal solution with an excess of isopropyl magnesium iodide in ether, the reaction mixture is heated to boiling for 1 to 2 hours on the water bath and after cooling decomposed with dilute hydrochloric acid. The further working up takes place in the customary manner. The crude reduction product is, in so far as the acetyl group has not already been split off in the course of the Grignard reaction, for the purpose of complete saponification heated with 5% methyl alcoholic caustic potash lye; for separation from starting material which has not entered into reaction, the reaction mixture is treated with semicarbazide acetate. From the remaining portion of the reaction mixture the etio-cholandiol-(3,17) can then be separated.

Example 4

In the same manner as described in Example 3, the acetate of 3-epi-hydroxy-etio-cholanone-(17) is caused to react with isopropyl magnesium iodide to the corresponding epi-compound of etio-cholandiol-(3,17).

Of course, various other modifications in the procedure of the process of the present invention may be resorted to within the scope of the appended claims without departing from the principles set forth herein.

What I claim is:

1. Compounds of the etio-cholane series having the general formula $C_{19}H_{29}XYZ$ and the structural formula

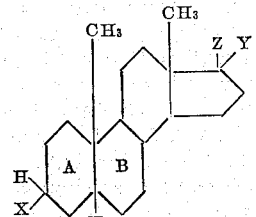

wherein the A and B rings are in the cis-position to each other, X and Y stand for a member of the group consisting of the hydroxyl group and groups that, upon hydrolysis, can be converted into the hydroxyl group, and Z represents a member of the group consisting of hydrogen and a hydrocarbon radical.

2. A 17-methyl-etio-cholandiol-3,17 compound of the general formula $C_{20}H_{32}XY$ and the structural formula

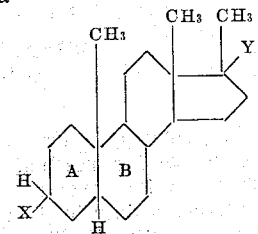

wherein the A and B rings are in cis-position to each other, and X and Y stand for a member of the group consisting of the hydroxyl group and groups that, upon hydrolysis, can be converted into the hydroxyl group.

3. A 17-ethyl-etio-cholandiol-3,17 compound of the general formula $C_{21}H_{34}XY$ and the structural formula

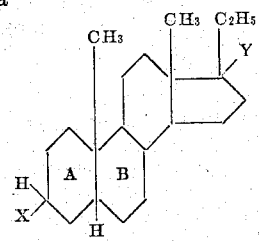

wherein the A and B rings are in cis-position to each other, and X and Y stand for a member of the group consisting of the hydroxyl group and groups that, upon hydrolysis, can be converted into the hydroxyl group.

4. An etio-cholandiol-3,17 compound of the general formula $C_{19}H_{30}XY$ and the structural formula

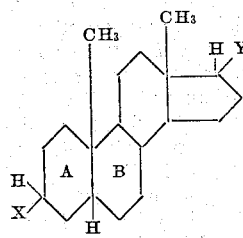

wherein the A and B rings are in cis-position to each other, and X and Y stand for a member of the group consisting of the hydroxyl group and groups that, upon hydrolysis, can be converted into the hydroxyl group.

5. 17-methyl-etio-cholandiol-3,17.
6. 17-ethyl-etio-cholandiol-3,17.
7. Etio-cholandiol-3,17.

FRIEDRICH HILDEBRANDT.